United States Patent [19]
Brewer et al.

[11] Patent Number: 5,929,840
[45] Date of Patent: Jul. 27, 1999

[54] SYSTEM AND METHOD FOR COMPUTER CURSOR CONTROL

[75] Inventors: Timothy T. Brewer, Seattle; Paul E. Henderson, Jr., Bellevue; Kenneth R. Robertson, Redmond; Anthony R. Claflin, Bellevue; Alan W. McRobert, Bothell, all of Wash.

[73] Assignee: Microsoft Corporation, Redmond, Wash.

[21] Appl. No.: 08/206,543

[22] Filed: Mar. 4, 1994

[51] Int. Cl.⁶ .................................................. G09G 5/08
[52] U.S. Cl. ........................... 345/145; 345/157; 345/159
[58] Field of Search ................................. 345/145, 146, 345/157, 156, 159, 163, 167, 168, 160, 162, 164, 165, 166, 344

[56] References Cited

U.S. PATENT DOCUMENTS

| 5,195,179 | 3/1993 | Tokunaga | 345/145 |
| 5,208,906 | 5/1993 | Morgan | 395/148 |
| 5,263,134 | 11/1993 | Paal et al. | 345/145 |
| 5,519,827 | 5/1996 | Mizushima | 345/344 |

FOREIGN PATENT DOCUMENTS

| 36 32 601 | 4/1987 | Germany . | |
| 2-294687 | 12/1990 | Japan | 345/157 |
| 2294687 | 12/1990 | Japan | 345/157 |

*Primary Examiner*—Xiao Wu
*Attorney, Agent, or Firm*—Seed and Berry LLP

[57] ABSTRACT

A system for preventing inadvertent wrapping of a cursor generated on a computer display detects the location of the cursor in proximity with a border of the display and determines whether a user actually intends the cursor to wrap to the opposite side of the display. The system considers a variety of factors to determine whether the user actually intends to wrap the cursor. The time for which the user moves the cursor against the border, the distance that the cursor would have moved but for the border, and the velocity or acceleration with which the cursor approaches the border can all be considered by the system in determining whether or not to permit the wrapping of the cursor. The system automatically generates an indicator signal to permit the cursor to wrap from one side of the display to the opposite side. The user can select the size of the border and determine whether the border will have a color different from the normal display background color to visually indicate the location of the border to the user. The system can selectively enable and disable the border in response to a variety of factors. The user can manually generate the indicator signal by activating a command signal input. The system can operate in a graphical environment where a plurality of display windows are shown on the computer display. The system defines a border for each window to prevent the inadvertent wrapping of the cursor.

48 Claims, 5 Drawing Sheets

SYSTEM AND METHOD FOR COMPUTER CURSOR CONTROL

TECHNICAL FIELD

The invention relates generally to a system and method for control of a cursor on a computer display screen.

BACKGROUND OF THE INVENTION

Computers have become common in the work place and at home. Early computer systems required extensive knowledge of computer programming to effectively operate the computer. Newer computers have been designed to permit simplified use by those without formal background in computer science. Operating systems, such as the Microsoft™ Windows® operating system provide a graphical environment that can be used by persons with little or no previous experience in the use of computers. Thus, computers have become easier to operate and their use has become more pervasive.

As computers become even more common, it is important that the operation of the computer become even easier and efficient to operate for the person using the computer. For example, the use of a cursor pointing device, such as a mouse, trackball, or the like, permits the easy manipulation of a cursor on the visual display coupled to the computer. However, there are situations in which even the movement of the cursor with a mouse becomes inefficient. For example, the movement of the cursor from one side of the visual display to the opposite side of the visual display requires extensive manipulation of the mouse. To simplify such movement, some prior art systems permit the movement of the cursor off one side of the visual display and cause the cursor to reappear on the opposite side of the visual display. This technique, known as screen wrapping, can simplify the movement of the cursor.

While screen wrapping can improve the efficiency of cursor movement, a common complaint of the screen wrap feature is that the cursor sometimes wraps to the opposite side of the visual display when the user did not intend the cursor to wrap. This inadvertent screen wrapping can cause a great deal of frustration, especially when the user must manipulate the cursor near one edge of the visual display. Therefore, it can be appreciated that there is a great need for a system and method for controlling the positioning of a cursor on the computer display that simplifies the positioning of the cursor on the visual display, particularly when moving the cursor near the edges of the visual display.

SUMMARY OF THE INVENTION

The present invention is embodied in a system and method for controlling cursor movement using a display having first and second opposing borders, and means for restricting the movement of the cursor beyond the first border. Signal generation means generate an indicator signal in response to a user effort to move the cursor beyond the first barrier. Wrapping means, enabled by the indicator signal, wrap the cursor from a location in the vicinity of the first border on the display to a location in the vicinity of the second border.

The first and second borders may be visually detectable to the user. The indicator signal may be generated by a variety of means such as continued movement of the cursor against the first border. The indicator signal may be generated when the cursor is moved against the first border for a predetermined period of time or for a predetermined distance. The indicator signal may be generated in response to the detection of a rate of movement with which the cursor approaches the first border. The rate of movement may be a velocity. The indicator signal may be generated when the velocity is below a predetermined velocity. Alternatively, the detected rate of movement may be an acceleration. The indicator signal may be generated when the acceleration is below a predetermined acceleration. Alternatively, the system may further include a command entry device operable by the user, with the indicator signal beam generated by the user activating the command entry device.

In an alternative embodiment, the system has selectively enabled wrapping means for wrapping the cursor from a location in the vicinity of the first border to a location in the vicinity of the second border. The wrapping means having enabled mode for restricting movement of the cursor beyond the first border in a disabled mode for permitting the movement of the cursor beyond the first border. The signal generation means generate an indicator signal in response to a user effort to move the cursor beyond the first border with the indicator signal placing the wrapping means in the disabled mode.

The signal generation means may initially place the wrapping means in a disabled mode with the first crossing of the first border causing the signal generation means to place the wrapping means in the enabled mode. The signal generation means may subsequently return the wrapping means to the disabled mode by the generation of the indicator signal.

In one embodiment, the indicator signal is generated by the continued movement of the cursor against the first border for a first predetermined period of time. The system may also include adjustment means for increasing the first predetermined period of time following the generation of the indicator signal for a first time such that the indicator signal is generated a second time by continued movement of the cursor against one of the first or second borders for an increased period of time. The adjustment means may increase the first predetermined period of time each time that the cursor recrosses one of the first and second borders within a second predetermined period of time. The adjustment means may also decrease the increased period of time when the indicator signal is not generated within the second predetermined period of time. Similarly, when the indicator signal is generated by continued movement of the cursor against the first border for a first predetermined distance, the system may include adjustment means for increasing the first predetermined distance following the generation of the indicator signal a first time such that the indicator signal is generated a second time by continued movement of the cursor against one of the first and second borders for the increased distance. The adjustment means may increase the first predetermined distance each time that the cursor recrosses one of the first and second borders within a predetermined period of time. The adjustment means can decrease the increased distance when the indicator signal is not generated within the predetermined period of time.

DETAILED DESCRIPTION OF THE INVENTION

The present invention implements a screen wrap barrier to limit the inadvertent wrapping of the cursor as is common in the prior art. The system of the present invention permits screen wrapping only after it has determined that a user probably intends to wrap the cursor to the opposite side of the visual display. There are a number of different techniques, described in detail below, by which the system can make such a determination.

Figure 1:
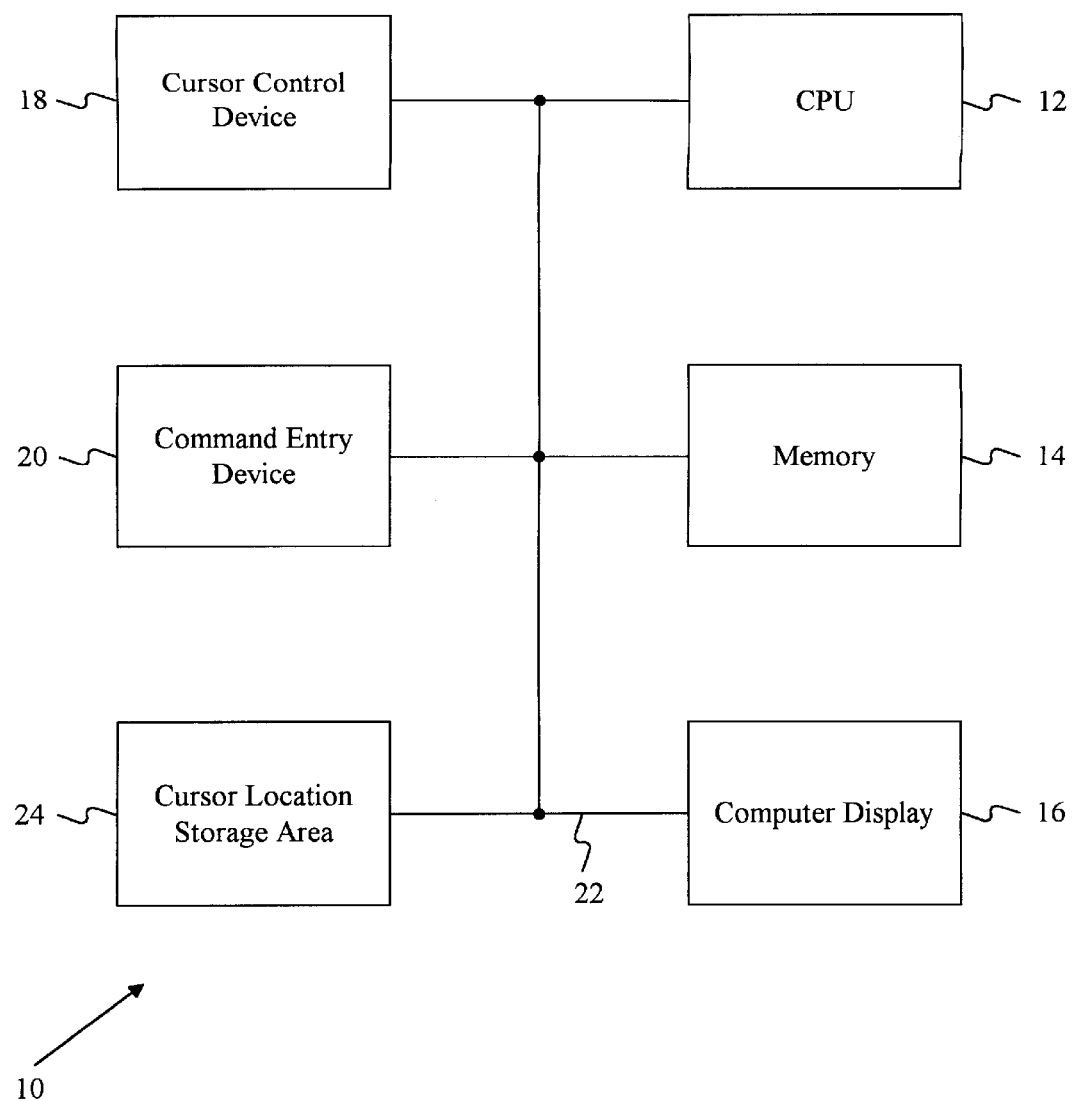
FIG. 1 is a functional block diagram of a system according to the present invention.

The present invention is embodied in a system 10 shown in the block diagram of FIG. 1. A central processing unit (CPU) 12 performs the analysis functions that will be described below. The CPU 12 can be any number of well known devices. The system 10 includes a memory 14, which may comprise both random access memory (RAM) and read-only memory (ROM). The memory 14 stores a software program that forms a portion of the system 10. A computer visual display 16, such as an LED or CRT display, is also included in the system 10. The display 16 may be an integral part of the system 10, such as when the system is incorporated into a laptop computer, or may be a stand alone device.

The system 10 also includes a cursor control device 18 that controls the position of a cursor generated on the display 16. The cursor control device 18 may be a mouse, joystick, trackball, keyboard, or the like. The present invention is not limited by the specific form of the cursor control device 18. The system 10 also includes a command entry device 20, which may be a button on the cursor control device 18 or on a keyboard (not shown). The system 10 may also include a second command entry device 21, such as a second button on the cursor control device 18 or on the keyboard (not shown). The user can position the cursor at a desired location on the display 16 using the cursor control device 18 and then press the command entry device 20 to activate a computer command associated with the selected location on the display. The various components of the system 10 are coupled together by a bus 22, which may carry power as well as data signals.

A cursor location storage area 24 of the system 10 contains a pointer to the location of the cursor on the display 16. The display 16 displays the cursor at the position corresponding to the data within the current location storage area 24. The current location storage area 24 may be part of the memory 14.

The cursor control device 18 generates electrical signals indicative of the desired movement of the cursor. The CPU 12 interprets the electrical signals from the cursor control device 18 and alters the current location storage area 24 accordingly. Each time that the CPU alters the current location storage area 24, the position of the cursor on the display 16 is changed in a corresponding fashion.

Figure 2:
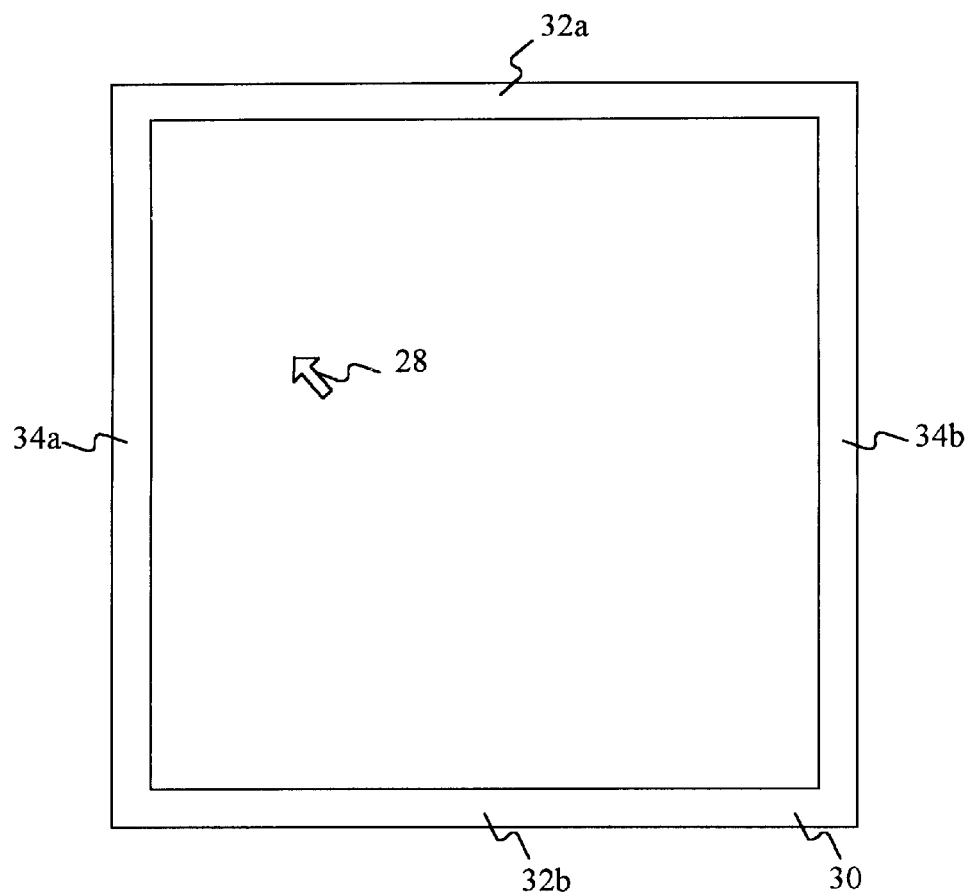
FIG. 2 illustrates the screen wrap barrier used by the system of FIG. 1.

As seen in FIG. 2, the display 16 is generally rectangular in shape and has an electronic border 30 displayed around the edges of the display. The border 30 may have the same color as the background graphics displayed on the display 16, or may have a different color so as to make the border 30 visually detectable by the user. The advantages of a visible border 30 will be discussed below. In one embodiment, the system 10 permits the user to determine the color of the border 30.

A cursor 28 is visible on the display 16; the position of the cursor 28 is controlled by the cursor control device 18 (see FIG. 1). The border 30 has two sets of opposing borders, comprising a top border 32a and an opposing bottom border 32b, and a left border 34a and an opposing right border 34b. It should be noted that the border 30 is shown in FIG. 2 with exaggerated dimensions relative to the overall size of the display 16 in order to more clearly depict the operation of the present invention. In the presently preferred embodiment, the border 30 is a single pixel wide on all four opposing borders 32a, 32b, 34a, and 34b. However, the border 30 can have an arbitrary thickness that may be specified by the user. For example, the border 30 may be five pixels wide on all four opposing borders 32a, 32b, 34a, and 34b, or may have a different width for each of the four opposing borders.

As the cursor 28 is moved using the cursor control device 18 to approach the border 30, the system 10 causes the movement of the cursor 28 to slow down or stop altogether. Thus, even though the user may continue to attempt to move the cursor 28 by manipulating the cursor control device 18, the system will not permit additional movement of the cursor 28 beyond the border 30 unless a barrier penetration indicator signal is generated. With a one pixel border 30, the cursor 28 can be positioned on the border, but cannot move beyond the border unless the indicator signal is generated. If the border 30 is more than one pixel wide, the system 10 causes the movement of the cursor 28 to slow down or stop within the border. If the indicator signal is generated, the system 10 "lowers the barrier" by deactivating the border 30 and permits the cursor 28 to wrap to the opposite side of the display 16 in a conventional manner.

The system 10 generates the indicator signal only if it determines that the user probably intends to wrap the cursor 28 to the opposite side of the display 16. The generation of the indicator signal may be controlled by a variety of factors. For example, continued efforts by the user to move the cursor 28 beyond the border 30 are interpreted by the system 10 as an indication that the user probably intends to wrap the cursor 28 to the opposite side of the display 16. The continued or repetitive effort to move of the cursor 28 against the border 30 is detected by the system 10 by analysis of the electrical signals from the cursor control device 18. The continued movement of the cursor 28 against the border 30 may be detected by measuring the time over which the user moves the cursor against the border, or, alternatively, by measuring the distance, based on the continued movement of the cursor against the border, that the cursor 28 would have traveled if no border 30 were in place to serve as a barrier (i.e., the distance that the cursor 28 would have moved were it not for the presence of the border 30). If the user continues to move the cursor 28 against the border 30 for a predetermined period of time, the system 10 will generate the indicator signal and permit the cursor 28 to move across the border and then to the opposite side of the display 16. Alternatively, if the user continues to manipulate the cursor control device 18, such that the cursor 28 would have moved more than a predetermined distance beyond the border 30 were it not for the presence of the border, the system will generate the indicator signal and permit the cursor 28 to wrap to the opposite side of the display 16.

In another embodiment, the system 10 measures the velocity with which the cursor 28 approaches the border 30 in order to determine whether or not to generate the indicator signal. The velocity of the cursor 28 can be determined by measuring the distance over which the cursor is moved in a given time period in response to the user manipulating the cursor control device 18. If the velocity of the cursor 28 is below a predetermined velocity, the system 10 interprets this as an indication that the user actually intends to wrap the cursor 28 to the opposite side of the display 16 because the user is intentionally moving the cursor against the border 30. On the other hand, a high velocity of the cursor 28 against the border 30 indicates that the user may not have intended the cursor 28 to wrap to the opposite side of the display 16. In such a situation, the system 10 will prevent the cursor 28 from wrapping unless the indicator signal is generated based on detecting the continued movement of the cursor against the border 30, as described above. Alternatively, the velocity can be analyzed such that a velocity that exceeds the predetermined threshold could be interpreted by the system 10 as an indicator that the user actually intends to cause the cursor 28 to wrap to the opposite side of the display 16.

In yet another alternative, if the user moves the cursor 28 against the border 30, stops at the border, and then move the cursor against the border again, the system 10 considers this an indication that the user actually intends to wrap the cursor 28 to the opposite side of the display 16. This is similar to the velocity measurement described above. In this embodiment, the velocity is zero at the border 30 and thus the system 10 will generate the indicator signal.

The acceleration of the cursor 28 may also be used as an indicator of the user's intent. For example, a decreasing acceleration in the vicinity of the border 30 is interpreted by the system 10 as an indication that the user intends to cause the cursor 28 to wrap to the opposite of the display 16. If the acceleration is above a predetermined acceleration, the system 10 interprets this as an indication that the user did not intend to cause the cursor 28 to wrap to the opposite side of the display 16. The acceleration may be measured by determining the change in the velocity of the cursor 28 over a given period of time in response to the user manipulating the cursor control device 18. Alternatively, the acceleration can be analyzed such that an acceleration that exceeds the predetermined threshold could be interpreted by the system 10 as an indicator that the user actually intends to cause the cursor 28 to wrap to the opposite side of the display 16.

The above examples are presented to indicate the variety of factors that can be used by the system 10 to determine whether or not to generate the indicator signal. As will be appreciated by those of ordinary skill in the art, the system 10 can analyze the various factors in number of different ways to determine whether or not to generate the indicator signal. The system 10 can also use a combination of factors to determine whether or not to generate the indicator signal. One such example of a combination of factors is time and distance. If the user continues to manipulate the cursor control device 18 to move the cursor 28 against the border 30 for a predetermined combination of time and distance (i.e., the distance that the cursor 28 would have moved were it not for the presence of the border 30), the system 10 will generate the indicator signal.

Other techniques may also be used to prevent the inadvertent wrapping of the cursor 28. In one embodiment, for example, the user manually generates the indicator signal by manipulating the cursor control device 18 to move the cursor 28 against the border 30 while simultaneously depressing a control switch such as the command entry device 20. The simultaneous activation of the command entry device 20 and the movement of the cursor 28 against the border 30 causes the system 10 to generate the indicator signal. Thus, the system 10 will only allow the cursor 28 to wrap to the opposite side of the display 16 if the user manually generates the indicator signal.

In yet another embodiment, the system 10 selectively activates and deactivates the border 30 displayed around the edges of the display 16. For example, in this embodiment the border 30 is initially deactivated, thus permitting the cursor 28 to wrap from one side of the display to the opposite side without requiring the generation of the indicator signal. The indicator signal can serve to deactivate or disable the border 30, while the border is active or enabled whenever the indicator signal is not present. Thus, the border 30 is defined by an enabled mode, in which the border prevents the wrapping of the cursor 28, and a disabled mode when the presence of the indicator signal permits the wrapping of the cursor 28. If the user manipulates the cursor control device 18 to cause the cursor 28 in FIG. 2 to cross the border 34a and appear on the opposite side of the display near border 34b, and then causes the cursor 28 to rewrap across border 34b to the opposite border 34a within a predetermined short first period of time, the system 10 interprets this as an indication that the user inadvertently caused the cursor 28 to wrap. In such a situation, the system 10 will activate the border 30 to prevent further inadvertent screen wrapping. The system 10 can be configured to activate the entire border 30 or just the border 34a which the user inadvertently crossed. The user must then subsequently cause the cursor 28 to wrap to the opposite side of the display 16 in one of the manners described above.

After a second predetermined period of time, the system 10 deactivates the border 30 to permit the user to wrap the cursor 28 without requiring the generation of the indicator signal. If the user wraps the cursor 28 and does not rewrap the cursor within the first predetermined period of time, the system 10 will not activate the border 30 and will continue to permit the cursor to wrap without requiring the generation of the indicator signal.

In the example above, if the user manipulates the cursor control device 18 to cause the cursor 28 to cross the border 34a and appear on the opposite side of the display near border 34b, but does not rewrap the cursor within the first predetermined period of time, the system 10 interprets this action as an indication that the user actually intended to wrap the cursor 28 to the opposite side of the display 16. In such a situation, the system 10 will not activate the border 30 and will not require the generation of the indicator signal until such time when the user wraps the cursor 28 and rewraps within the first predetermined period of time. This embodiment permits the simple wrapping of the cursor 28 without the delay that may be required to generate the indicator signal, but will activate the border 30 if the user's activity indicates that an inadvertent wrapping of the cursor 28 has occurred.

In another embodiment, the system 10 has a plurality of border activation levels that are incrementally altered each time that the cursor 28 wraps within the first predetermined period of time. For example, the system 10 initially deactivates the border 30. However, the first time that the user causes the cursor 28 to wrap from one side of the display 16 to the opposite side of the display, the system 10 activates the border 30 to a first activation level. Each time that the cursor 28 rewraps during the predetermined period of time causes the border 30 to have an incrementally higher border activation level thus making it increasingly more difficult to wrap the cursor 28. The user can penetrate the barrier by causing the system 10 to generate the indicator signal as discussed above. However, for each increase in the border activation level the user must move the cursor 28 against the border 30 for a greater period of time than with a lower border activation level or move a greater distance (i.e., the distance that the cursor 28 would have moved were it not for the presence of the border 30) if factors such as time and/or distance are used to generate the indicator signal. The border activation level decreases incrementally for each first predetermined period of time in which the cursor 28 is not wrapped. Alternatively, the system 10 can deactivate the border 30 altogether if no subsequent wrapping occurs within the predetermined period of time.

Alternatively, the system 10 initially starts with the border 30 in an inactive state and activates the border when the user causes the cursor 28 to cross the border the first time. In this embodiment, the cursor 28 would be prevented from inadvertently rewrapping. The system 10 measures a predetermined period of time after the cursor 28 first crosses the border 30. If there is no additional wrapping of the cursor 28 within the predetermined period of time, the system 10 will deactivate the border 30 and return the system to its original state.

Figure 3:
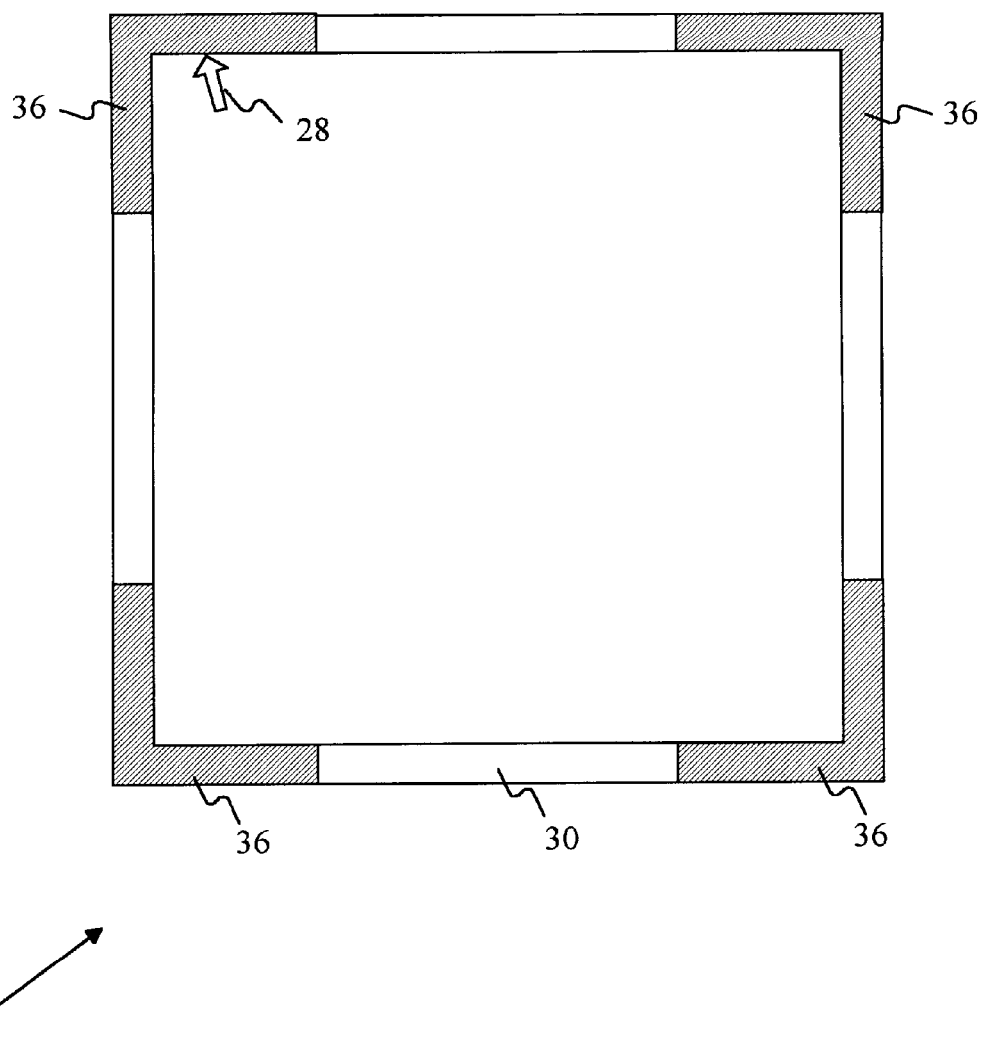
FIG. 3 illustrates a partial screen wrap barrier used by the system of FIG. 1.

The user may also designate portions of the border 30 as impenetrable so that the designated portion of the border cannot be penetrated even upon continued movement of the cursor 28 against the designated portion of the border. For example, the user may designate corners 36, shown in FIG. 3, of the border 30 as having no screen wrap capability. Thus, even continued movement of the cursor 28 against the corners 36 will not cause the cursor to wrap to the opposite side of the display 16. In this embodiment, the corners 36 are displayed in a different color than the border 30 on the display 16 to indicate to the user that no screen wrap will occur in these corner areas. Alternatively, the user may designate any portion of the border 30 as impenetrable.

Figure 4:
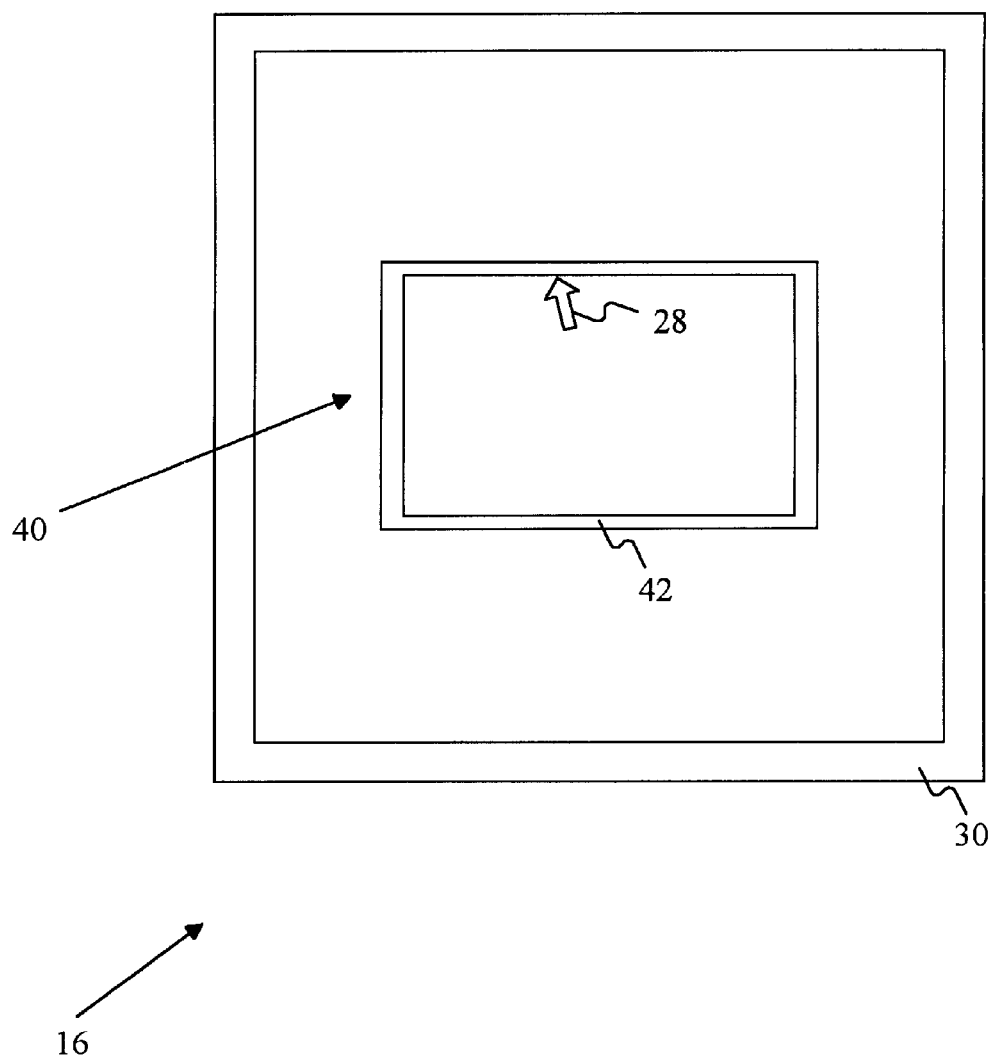
FIG. 4 illustrates the screen wrap barrier used by the system of FIG. 1 when an additional window is visible on the computer display.

In a graphical environment such as the Windows® operating system, the user may cause a small window 40 with a border 42 to appear on the display 16, as shown in FIG. 4. The principles of the system may apply equally to the window 40. The border 42 surrounding the window 40 can prevent the user from inadvertently causing the cursor 28 from wrapping from one side of the window 40 to the opposite side.

Figure 5:
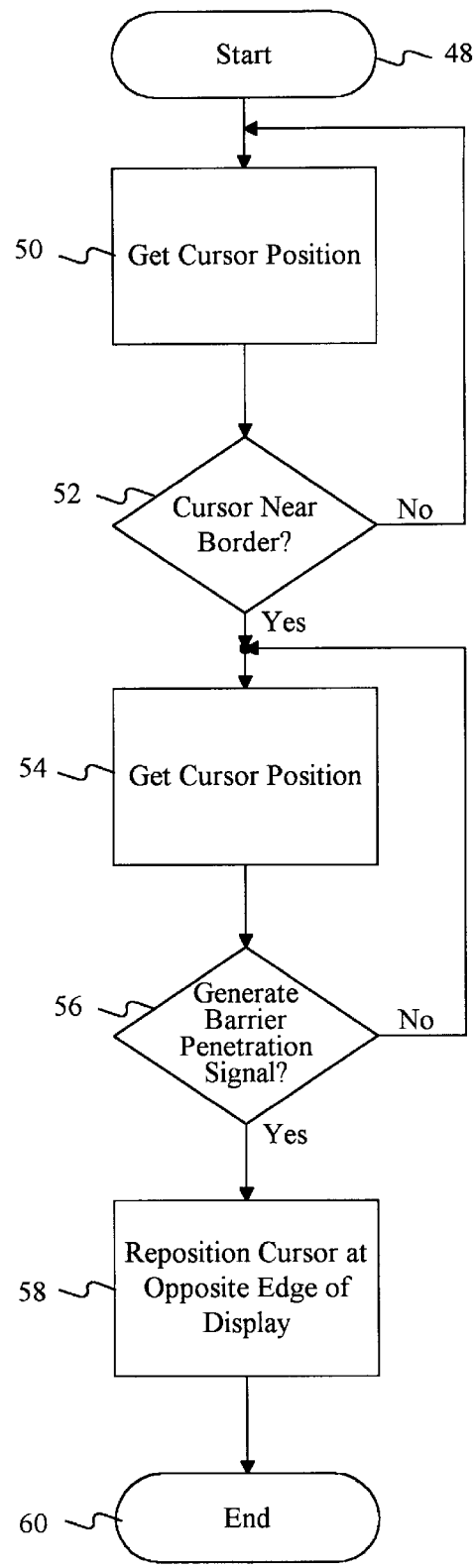
FIG. 5 is a flow chart of the operation of the system of FIG. 1.

The operation of the present invention is illustrated in the flowchart of FIG. 5. The system 10 begins processing data at start 48. In step 50, the system 10 gets a current cursor position from the cursor location storage area 24. Techniques for determining the current cursor position are well-known in the art and will not be discussed herein. In decision 52, the system determines whether the current cursor position is near the border 30. If the current cursor position is not near the border 30, the result of decision 52 is NO and the system 10 returns to step 50. If the current cursor position is near the border 30, the result of decision 52 is YES. In that event, the system 10 gets an updated cursor position in step 54. In decision 56, the system 10 determines whether or not to generate the indicator signal and permit the cursor 28 to wrap across the border 30. This decision step is intended to encompass the broad range of techniques described above, including enabled and disabled modes, variable border activation levels, time, distance, acceleration, velocity, and the like. The factors used in the determination of whether or nor to generate the indicator signal are discussed in detail above.

If the system 10 does not generate the indicator signal, the result of decision 56 is NO, and the system returns to step 54. If the system 10 does generate the indicator signal, the result of decision 56 is YES. In that event, the system 10 repositions the cursor 28 at the opposite edge of the display 16. The system 10 ends the process of indicator in step 60.

Thus, the present invention permits the full use of screen wrapping capabilities available in the prior art without the drawback of inadvertent screen wrapping. The present invention describes a variety of factors used to determine whether or not to generate the indicator signal. These techniques may be used individually or in combination, and may be selected by the user to customize the system 10 to the particular user's needs. While the above examples are related to the movement of the cursor 28 through a cursor control device 18 such as a computer mouse, those skilled in the art will readily appreciate that the principles of the present invention are equally applicable to any cursor control device such as a joystick, trackball, keyboard, or the like.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A computer system for controlling the movement of a cursor, the computer system comprising:

a display having first and second opposing borders;

means for restricting the movement of the cursor beyond said first border;

signal generation means for generating an indicator signal in response to a user effort to move the cursor beyond said first border with a first pattern of cursor movement, said generation means being unresponsive to a user effort to move the cursor beyond said first border with a second pattern of cursor movement different from said first pattern; and wrapping means, disabled by said restricting means and selectively enabled by said indicator signal, and when enabled wrapping the cursor from a location in the vicinity of said first border on said display to a location in the vicinity of said second border on said display.

2. The system of claim 1 wherein said first and second borders are visually detectable to the user.

3. The system of claim 1 wherein said first pattern includes continued movement of the cursor against said first border.

4. The system of claim 3 wherein said first pattern includes continued movement of the cursor against said first border for a predetermined period of time.

5. The system of claim 3 wherein said first pattern includes continued movement of the cursor against said first border for a predetermined distance.

6. The system of claim 1 wherein said first pattern includes a rate of movement with which the cursor approaches said first border.

7. The system of claim 6 wherein said rate of movement is a velocity.

8. The system of claim 7 wherein said velocity is below a predetermined velocity.

9. The system of claim 6 wherein said rate of movement is an acceleration.

10. The system of claim 9 wherein said acceleration is below a predetermined acceleration.

11. A computer system for controlling the position of a cursor, the computer system comprising:

a display having first and second opposing borders;

selectively enabled wrapping means for wrapping the cursor from a location in the vicinity of said first border on said display to a location in the vicinity of said second border on said display, said wrapping means having a disabled mode for preventing the movement of the cursor beyond said first border and an enabled mode for permitting the movement of the cursor beyond said first border; and signal generation means for generating an indicator signal in response to a user indication of a desire to move the cursor beyond said first border with a first pattern of cursor movement, said generation means being unresponsive to a user effort to move the cursor beyond said first border with a second pattern of cursor movement different from said first pattern, said indicator signal placing said wrapping means in said enabled mode.

12. The system of claim 11 wherein said wrapping means are initially placed in said enabled mode by said signal generation means, said signal generation means selectively placing said wrapping means in said disabled mode by the cursor making a first crossing of said first border to wrap the cursor to said second border.

13. The system of claim 12 wherein said signal generation means selectively returns said wrapping means to said enabled mode in response to said first pattern.

14. The system of claim 13 wherein said first pattern includes continued movement of the cursor against said first border.

15. The system of claim 14 wherein said first pattern includes continued movement of the cursor against said first border for a predetermined period of time.

16. The system of claim 14 wherein said first pattern includes continued movement of the cursor against said first border for a predetermined distance.

17. The system of claim 11 wherein said first pattern includes a rate of movement with which the cursor approaches said first border.

18. The system of claim 17 wherein said rate of movement is a velocity.

19. The system of claim 18 wherein said velocity is below a predetermined velocity.

20. The system of claim 19 wherein said rate of movement is an acceleration.

21. The system of claim 20 wherein said acceleration is below a predetermined acceleration.

22. The system of claim 11 wherein said first and second borders are visually detectable to the user.

23. The system of claim 11 wherein said first pattern includes continued movement of the cursor against said first border for a first predetermined period of time, the system further including adjustment means for altering said first pattern by increasing said first predetermined period of time following the generation of said indicator signal a first time, whereby said indicator signal is generated a second time by continued movement of the cursor against one of said first and second borders for said increased period of time.

24. The system of claim 23 wherein said adjustment means increases said first predetermined period of time each time that the cursor recrosses one of said first and second borders within a second predetermined period of time.

25. The system of claim 23 wherein said adjustment means decreases said increased period of time when said indicator signal is not generated within a second predetermined period of time.

26. The system of claim 11 wherein said continued movement of the cursor against said first border for a first predetermined distance, the system further including adjustment means for altering said first pattern by increasing said first predetermined distance following the generation of said indicator signal a first time, whereby said indicator signal is generated a second time by continued movement of the cursor against one of said first and second borders for said increased distance.

27. The system of claim 26 wherein said adjustment means increases said first predetermined distance each time that the cursor recrosses one of said first and second borders within a predetermined period of time.

28. The system of claim 26 wherein said adjustment means decreases said increased distance when said indicator signal is not generated within a predetermined period of time.

29. The system of claim 11 wherein said wrapping means are initially in said enabled mode and are placed in said disabled mode by said signal generation means upon the cursor making a first crossing of said one border to wrap the cursor to said second border followed by the cursor making a recrossing of said second border to wrap the cursor to said first border.

30. The system of claim 29 wherein said signal generation means places said wrapping means in said disabled mode only if said recrossing occurs within a predetermined period of time.

31. The system of claim 11 wherein said first pattern includes detecting the cursor encountering said first border a first time, detecting no movement of the cursor for a predetermined period of time, and subsequently detecting the cursor to encountering said first border a second time.

32. A computer system for controlling the position of a cursor, the computer system comprising:

a display having first and second opposing borders;

selectively enabled barrier means having an enabled mode for restricting the movement of the cursor beyond at least a first portion of said first border and a disabled mode for permitting the movement of the cursor beyond said first portion;

signal generation means for generating an indicator signal in response to a user effort to move the cursor beyond said first border with a first pattern of cursor movement, said generation means being unresponsive to a user effort to move the cursor beyond said first border with a second pattern of cursor movement different from said first pattern, said indicator signal disabling said barrier means in said disabled mode to permit the cursor to move beyond said first portion to said second border when in said disabled mode, said barrier means preventing the movement of the cursor beyond said first portion to said second border when in said enabled mode; and wrapping means, disabled by said barrier means and selectively enabled by said indicator signal, and when enabled, wrapping the cursor from a location in the vicinity of said first portion on said display to a location in the vicinity of said second border on said display, whereby the cursor wraps from said first portion to said second border if said barrier means are disabled.

33. The system of claim 32 wherein said first portion is visually detectable to the user.

34. The system of claim 32, further including a second portion of said first border having an impenetrable border that does not have said disabled mode, whereby the cursor cannot cross said second portion.

35. A method in a computer system for controlling the position of a cursor on a display coupled to a computer, comprising the computer-implemented steps of:

detecting the position of the cursor on the display;

restricting the movement of the cursor beyond first and second opposing borders on the display;

generating an indicator signal to permit the cursor to move beyond said first border to said second border in response to a user effort to move the cursor beyond said first border with a first pattern of cursor movement, said step of generating said indicator signal being unresponsive to a user effort to move the cursor beyond said first border with a second pattern of cursor movement different from said first pattern; and in response to said indicator signal, wrapping the cursor from a location in the vicinity of said first border on the display to a location in the vicinity of said second border on the display.

36. The method of claim 35 wherein said first and second borders are visually detectable to the user.

37. The method of claim 35 wherein said first pattern includes continued movement of the cursor against said first border.

38. The method of claim 35 wherein said first pattern includes continued movement of the cursor against said first border for a predetermined period of time.

39. The method of claim 35 wherein said first pattern includes continued movement of the cursor against said first border for a predetermined distance.

40. The method of claim 35 wherein said first pattern includes a rate of movement with which the cursor approaches said first border.

41. The method of claim 40 wherein said rate of movement is a velocity.

42. The method of claim 41 wherein said velocity is below a predetermined velocity.

43. The method of claim 40 wherein said rate of movement is an acceleration.

44. The method of claim 43 wherein said acceleration is below a predetermined acceleration.

45. The method of claim 35 wherein said step of restricting the movement of the cursor beyond first and second opposing borders on the display is selectively enabled and has an enabled mode for preventing the movement of the cursor beyond said first border and a disabled mode for permitting the movement of the cursor beyond said first border.

46. The method of claim 45 wherein said step of restricting the movement of the cursor beyond first and second opposing borders on the display is initially placed in said disabled mode, said step of restricting the movement of the cursor beyond first and second opposing borders on the display entering said enabled mode by the cursor making a first crossing of said first border to wrap the cursor to said second border.

47. The method of claim 45 wherein said step of generating said indicator signal selectively returns said step of restricting the movement of the cursor beyond first and second opposing borders on the display to said disabled mode by the generation of said indicator signal.

48. A computer system for controlling the position of a cursor, the computer system comprising:

a display having first and second opposing borders;

selectively enabled wrapping means for wrapping the cursor from a location in the vicinity of said first border on said display to a location in the vicinity of said second border on said display, said wrapping means having a disabled mode for preventing the movement of the cursor beyond said first border and an enabled mode for permitting the movement of the cursor beyond said first border;

a command entry device operable by a user; and signal generation means for generating an indicator signal in response to a user activation of said command entry device, said indicator signal placing said wrapping means in said enabled mode, said generation means being unresponsive to a user effort to move the cursor beyond said first border in the absence of said user activation of said command entry device.

\* \* \* \* \*